July 26, 1927.
L. W. MUELLER
1,637,230
VALVE FOR BUILT-IN PLUMBING FIXTURES
Filed Oct. 21, 1925
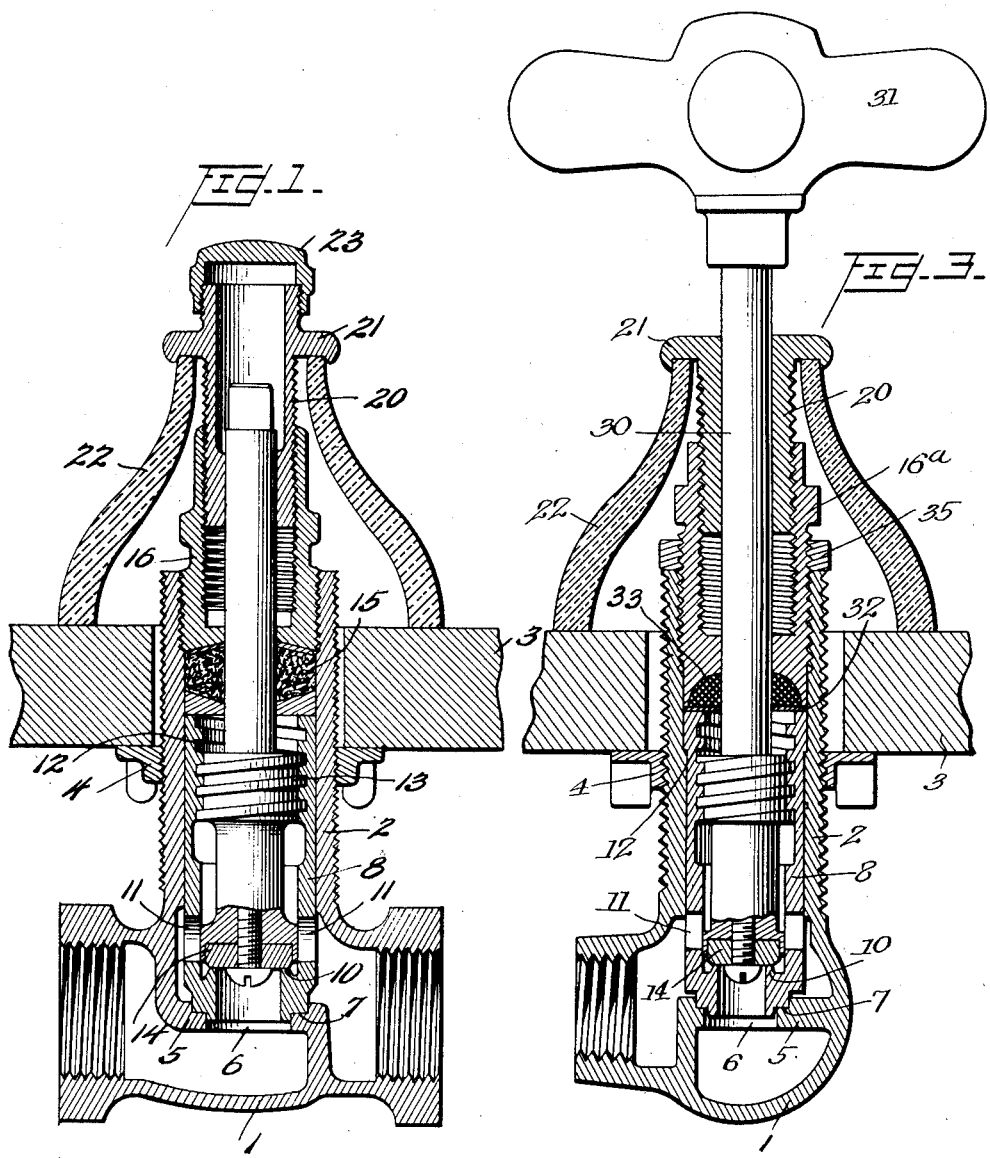
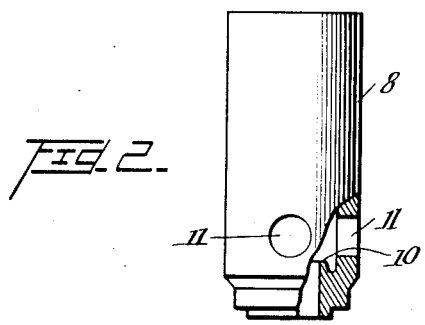
Inventor
*Lucien W. Mueller,*
By *Cushman, Bryant & Darby*
Attorneys Patented July 26, 1927.

1,637,230

UNITED STATES PATENT OFFICE.

LUCIEN W. MUELLER, OF DECATUR, ILLINOIS, ASSIGNOR TO ADOLPH MUELLER, TRUSTEE, OF DECATUR, ILLINOIS.

VALVE FOR BUILT-IN PLUMBING FIXTURES.

Application filed October 21, 1925. Serial No. 63,929.

The present invention relates to improvements in valves or stops for built-in plumbing fixtures such as bath tubs, lavatories, etc., and will be described in connection with the accompanying drawing, in which:

Figure 1 is a longitudinal section through a valve or stop constructed in accordance with the invention.

Figure 2 is a detail view of the valve seat tube detached.

Figure 3 is a view similar to Figure 1, illustrating a slightly different form of the invention.

In the drawing, 1 designates the body of the stop or casing which is provided with the usual inlet and outlet openings and with a lateral tubular extension 2 that extends through the wall or body 3 of the fixture in connection with which the valve or stop is employed.

As shown, this lateral extension is exteriorly threaded and a nut 4 secured thereon bears closely against the wall or body member 3 to secure the fixture in position.

As usual, in valves of this type, the body is provided with an interior partition 5 that separates the inlet and outlet openings and is provided with a passage or opening 6 shown as having an internal annular shoulder 7 formed therein.

Seated in the outer enlarged portion of the opening 6, through the partition, is a valve seat tube 8 which is provided with an integral internal annular valve seat 10 and with a plurality of apertures 11 through which fluid can pass to the opening 6 in the partition and from the inlet to the outlet of the valve body.

The tube 8 extends into the lateral extension 2 of the valve body and has formed in its inner surface a compression thread 12 with which engages the threaded section 13 of the stem of a valve 14 that is adapted to cooperate with the seat 10 before referred to.

The valve stem extends outward beyond the end of the lateral extension 2 of the valve body and in the embodiment of the invention illustrated in Figure 1 is surrounded within such extension by a suitable packing 15, a suitable washer being arranged between the outer end of the tube 8 and the packing. A plug 16 screwed in the outer end of the lateral extension 2 serves to confine the packing 15 and retain the valve tube 8, and valve within the body extension 2.

A tubular member 20 is screwed into the outer end of the plug 16 and has an annular flange 21 that overhangs the outer contracted end of a canopy or housing 22, commonly made of porcelain or similar material, which extends to the outer face of the wall or support 3 and surrounds the portion of the valve fitting that projects beyond said face.

The member 20 is closed at its outer end by a cap 23 so that a suitable key or other implement may be inserted and engaged with the outer end of the valve stem to manipulate the valve as desired.

If preferred, and as shown in Figure 3, the valve stem may be extended throughout the length of the member 20 and provided at its outer end with a suitable handle by means of which it can be rotated to move the valve to or from the seat 10.

It will be seen that the valve seat 10, while held in close engagement with the partition 5 is not directly secured thereto and can be withdrawn from the extension 2 with the valve as hereinafter described if desired.

In the embodiment of the invention illustrated in Figure 3, the body 1 of the valve is of slightly different form from that shown in Figure 1, in that the inlet and outlet are arranged at an angle to each other instead of in alignment. The body, however, is provided with an interior partition 5 extending between the inlet and outlet, and through which is formed the opening 6, with which communicates the lower end of the tube 8 as previously described.

In this embodiment of the invention the stem 30 of the valve extends continuously throughout the length of the fixture and on the outer end thereof is suitably secured a handle 31 by means of which the valve 14 may be moved to and from the seat 10.

Instead of arranging a packing throughout the entire cross sectional area of the body extension 2, between the plug 16 and a washer at the outer end of the tube 8, the plug 16ª of this embodiment of the invention is preferably provided with a recess at its inner end, the surrounding annular wall of which contacts with a washer 32 interposed between said end and the outer end of the tube 8. A cone packing 33 is inserted in the recess at the inner end of the plug 16ª and this packing is compressed in its seat by contact with the washer 32.

A nut 35 is shown as engaging the exterior thread of the plug 16ᵃ and abutting the end of the lateral extension 2 of the valve body.

It will be seen that with both the forms illustrated the tube 8 and valve therein may be removed as a unitary structure from the fixture by detaching the plug 16, 16ᵃ, and exerting an outward pull on the valve stem. This permits ready access to these parts, for purpose of repair or replacement, if necessary, without adjustment of the body of the fixture.

In the drawing several of the parts are shown more or less diagrammatic and it is also to be understood that there can be variations in the size and proportion without departing from the invention.

Having thus described the invention, what is claimed is:

In a valve of the character described, the combination of a casing comprising a main body portion provided with inlet and outlet openings, separated by an interior partition provided with an opening, and a lateral tubular extension which is exteriorly threaded and provided adjacent its outer end with an interior thread, a nut engaging the exterior thread on said tubular extension and adapted to be turned thereon into close engagement with a wall or body, a tube within the lateral body extension having its inner end communicating with the opening in the said partition and provided with an interior compression thread, said tube being provided with an interior valve seat and with a lateral opening that communicates with one of the openings in the body portion, a valve adapted to control flow through the valve seat within the tube and having its stem extending outward through the tube and tubular body extension and provided with a threaded section engaging said compression thread, a plug engaging the interior thread at the outer end of the tubular body extension and confining the valve seat tube in position, an escutcheon surrounding the outer end of the tubular body extension and the portion of said retaining plug projecting therefrom, and a member engaged with said plug and providing an annual flange that extends over and engages the outer end of the escutcheon, for the purpose described.

In testimony whereof I have hereunto set my hand.

LUCIEN W. MUELLER.